(No Model.)
T. A. EDISON.
REGULATOR FOR DYNAMO ELECTRIC MACHINES.
No. 271,616. Patented Feb. 6, 1883.
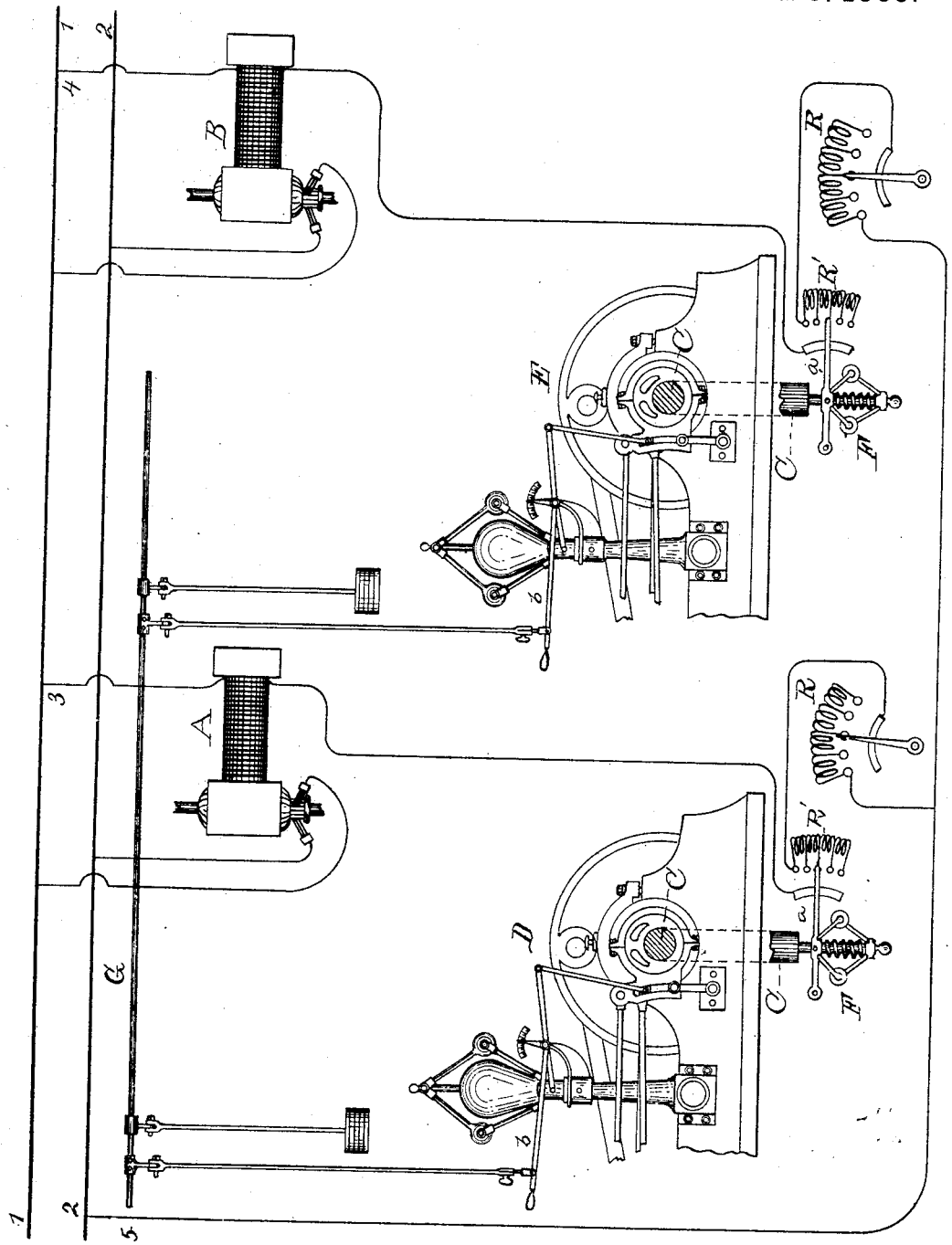
ATTEST:
E. C. Rowland
H. W. Seely
INVENTOR:
Thomas A. Edison,
By Rich'd N. Dyer,
Atty.

UNITED STATES PATENT OFFICE.

THOMAS A. EDISON, OF MENLO PARK, NEW JERSEY.

REGULATOR FOR DYNAMO-ELECTRIC MACHINES.

SPECIFICATION forming part of Letters Patent No. 271,616, dated February 6, 1883.

Application filed October 20, 1882. (No model.)

*To all whom it may concern:*

Be it known that I, THOMAS A. EDISON, of Menlo Park, in the county of Middlesex and State of New Jersey, have invented a new and useful Improvement in Means for Operating Electrical Generators, (Case No. 497,) of which the following is a specification.

The object I have in view is to maintain a uniform electro-motive force in all of a number of dynamo or magneto electric machines operated by two or more separate engines or motors and feeding into the same conductors or system of conductors, in order to avoid the racing of the engines and the loss of power caused by conversion of part of the generators into electromotors by reason of variations in the speed of the engines. This I accomplish by the use, in connection with each engine, of a mechanism controlled preferably by the speed of the engine, and arranged to regulate the electro-motive force of the generator or generators driven by it, so as to counteract the effect of the variations in the speed of the engine and maintain a uniform electro-motive force. This mechanism is employed in addition to the devices for varying the electro-motive force of the generator or generators as required by the addition or removal of translating devices, its office being simply to maintain the electro-motive force for which the machines are adjusted. I also prefer to employ means for causing all the engines to run in unison, as described in my application No. 488, (Serial No. 74,096;) but such means may be dispensed with.

The invention is illustrated in the accompanying drawing, which is a view of the principal parts of the cut-off mechanisms of two steam-engines, the generators driven thereby, but shown separated for clearness, and the regulating devices.

A B represent dynamo or magneto electric machines, which are of any suitable pattern and have their commutators connected with the same conductors, 1 2, or the same system of conductors. There may be any desired number of these generators connected in multiple arc, as shown, or in series or multiple series. Each generator is preferably coupled directly with the engine-shaft C, there being two engines, D E, shown, one for each generator; but it is evident that the generator can be connected with the engine-shaft by an endless belt, or by gearing, or that two or more generators (a battery) can be run by one engine, or that two or more engines can be used to operate each battery of generators. In short, the invention is applicable to any arrangement wherein dynamo or magneto electric machines are operated by separate sources of motive power, without regard to whether the electrical generators are divided into lots of one or more, or to whether each source of motive power is composed of one or more engines or motors. The arrangement shown is that preferred by me, each generator being run by a separate steam-engine. The field-circuits 3 5 and 4 5 of the generators are preferably separate multiple-arc circuits from 1 2, although they may be from another source of electrical energy. Each generator is provided with means for regulating its electro-motive force, as required by the addition or removal of translating devices, such means being preferably an adjustable resistance, R', in its field-circuit. The means preferred for maintaining a constant electro-motive force of each generator controlled by the speed of the engine is a spring-governor, F, located directly upon the engine-shaft, or upon a spindle run from the engine-shaft. The pivoted lever $a$ of the governor forms the contact-arm of an adjustable resistance, R', located directly in the field-circuit of the generator. At a mean speed the lever $a$ will be in contact with the central point of the resistance R'. Any increase of speed of one engine independent of the others would ordinarily increase the electro-motive force of the particular machine beyond that of the others. This increase of speed, however, throws a further part of the resistance R' into the field-circuit of the machine, increasing the resistance of the field-circuit and counteracting the effect of the increase in speed. A decrease of speed has the contrary effect, throwing resistance out of the field-circuit. Thus it will be seen that the machines will always have the same electro-motive force notwithstanding variations in the speed of the engines.

Instead of having the extra resistance worked by a spring-governor, it may be adjusted by hand, which would enable the engineer to compensate for differences in speed between the engines, due to differences in friction or other causes.

The means described for maintaining uniform electro-motive force independent of variations in speed of the engines may be employed when a mechanical or electrical mechanism is used connecting the engines, so that they will work in unison, as described in my application before referred to.

On account of differences in friction, or from other causes, the mechanism for producing unison in speed may not, under all conditions, have the required efficiency. Hence the mechanism for maintaining uniform electro-motive force independent of variations in speed is useful in connection with it, although either mechanism may be used without the other.

Automatic cut-off engines of the Porter and Allen type are shown for illustration. The governor-arms $b$ of these engines are connected removably and adjustably with the common shaft G, whereby any variation of the cut-off mechanism of one engine will produce a corresponding and simultaneous variation of the cut-off mechanisms of the other engines.

What I claim is—

1. The combination, with two or more independent engines and dynamo or magneto electric machines operated thereby and feeding into the same conductors, of means controlled by the speed of each engine for maintaining a constant electro-motive force of the generator or generators operated by it by compensating for variations in speed, whereby the electro-motive force of all the generators will be uniform, substantially as set forth.

2. The combination, with two or more independent engines and dynamo or magneto electric machines operated thereby and feeding into the same conductors, of means for varying the electro-motive force of the machines as required by the addition and removal of translating devices, and means for regulating each generator to compensate for differences in the speed of the engines, substantially as set forth.

3. The combination, with two or more independent engines and dynamo or magneto electric machines operated thereby and feeding into the same conductors, of means connecting the throttle-valve or cut-off mechanisms of the engines, and producing simultaneous and corresponding movements of such parts, and means controlled by the speed of each engine for maintaining a constant electro-motive force of the generator or generators operated by it, substantially as set forth.

4. The combination, with two or more independent engines and dynamo or magneto electric machines operated thereby and feeding into the same conductors, of means connecting the throttle-valve or cut-off mechanisms of the engines, and producing simultaneous and corresponding movements of such parts, means for regulating each generator to compensate for differences in the speed of the engines, and means for varying the electro-motive force of the generators as required by the addition or removal of translating devices, substantially as set forth.

This specification signed and witnessed this 16th day of October, 1882.

THOS. A. EDISON.

Witnesses:
  RICHD. N. DYER,
  H. W. SEELY.